(12) United States Patent
Carpenter et al.

(10) Patent No.: US 11,715,096 B2
(45) Date of Patent: *Aug. 1, 2023

(54) AUGMENTED REALITY CARD ACTIVATION

(71) Applicant: Capital One Services, LLC, McLean, VA (US)

(72) Inventors: Reilly Carpenter, McLean, VA (US); Joanna Chen, McLean, VA (US); Sarah Calandro, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 90 days.

This patent is subject to a terminal disclaimer.

(21) Appl. No.: 17/337,527

(22) Filed: Jun. 3, 2021

(65) Prior Publication Data
US 2021/0287205 A1    Sep. 16, 2021

Related U.S. Application Data

(63) Continuation of application No. 16/444,027, filed on Jun. 18, 2019, now Pat. No. 11,055,699, which is a continuation of application No. 15/897,511, filed on Feb. 15, 2018, now Pat. No. 10,614,448, which is a continuation of application No. 14/836,028, filed on Aug. 26, 2015, now Pat. No. 10,332,103.

(60) Provisional application No. 62/042,498, filed on Aug. 27, 2014.

(51) Int. Cl.
*G06Q 20/34* (2012.01)
*G06Q 20/36* (2012.01)
*G06Q 20/32* (2012.01)

(52) U.S. Cl.
CPC ......... *G06Q 20/354* (2013.01); *G06Q 20/322* (2013.01)

(58) Field of Classification Search
CPC ........................... G06Q 20/354; G06Q 20/322
USPC ........................................................ 705/41
See application file for complete search history.

(56) References Cited

U.S. PATENT DOCUMENTS

| | | | | |
|---|---|---|---|---|
| 2011/0055049 A1* | 3/2011 | Harper | ................... | G06Q 20/28 707/E17.014 |
| 2012/0036066 A1* | 2/2012 | MacGuire | .............. | G06Q 40/02 705/41 |
| 2013/0166441 A1* | 6/2013 | Kobylkin | .............. | G06Q 20/348 705/35 |
| 2014/0061299 A1* | 3/2014 | Scipioni | ................ | G07F 7/1008 235/380 |
| 2014/0076965 A1* | 3/2014 | Becorest | .............. | G06Q 20/342 235/375 |

* cited by examiner

*Primary Examiner* — Hai Tran
(74) *Attorney, Agent, or Firm* — Perkins Coie LLP

(57) ABSTRACT

Systems and methods are provided for activating a card using augmented reality. The systems and methods may include capturing a real-time image of the card using a customer device, and extracting card information from the real-time image. The card information may be processed and used by a customer device or a financial provider server to activate the card. The customer device may display interactive graphics overlaid on the real-time card image to guide the customer through the activation process, and to educate the customer about the components of the card and aspects of the financial service associated with the card, such as a credit card service. The customer may interact with the overlaid graphics such as by selecting icons or portions of the card to trigger tutorials or to set preferences related to the card and/or financial service.

20 Claims, 7 Drawing Sheets

AUGMENTED REALITY CARD ACTIVATION

CROSS REFERENCE TO RELATED APPLICATIONS

This application is a continuation of U.S. patent application Ser. No. 16/444,027, filed on Jun. 18, 2019, which is a continuation of U.S. patent application Ser. No. 15/897,511, filed on Feb. 15, 2018, which is a continuation of U.S. patent application Ser. No. 14/836,028, filed on Aug. 26, 2015, which claims the benefit of priority from U.S. Provisional Application No. 62/042,498 filed Aug. 27, 2014, The contents of which are hereby incorporated by reference in their entirety

BACKGROUND

Credit cards are a very popular form of payment in today's society due in large part to their ease of use and transaction speed. But even with their widespread use and convenience, credit card systems still suffer from cumbersome activation processes and inadequate customer education about the credit card system. When customers receive new credit cards, they must first activate or register the cards before making any purchases. While necessary to ensure that the customers' identities are protected, credit card activation is generally a cumbersome process requiring the customers to follow various written instructions included with the card. Once the card is activated, the customer is free to use the card, but often proceeds without knowledge of significant aspects of the card's usage and payment terms and/or only a general knowledge of typical credit card systems. Thus, current activation processes pose multiple problems.

For example, the written activation instructions included with credit cards usually instruct the customer to call an activation phone number or navigate to an activation website, where additional instructions are presented usually requiring the customer to manually enter the card information and numerous other credentials. The number of steps involved and the need to make phone calls or open web browsers often frustrates and discourages customers from activating and using their cards right away.

As another example of their shortcomings, current credit card activation systems allow customers to begin making purchases immediately upon phone or web activation without providing any educational information about their credit account. As noted above, many uninformed customers are new to credit cards, but even experienced cardholders do not know significant aspects of credit such as the card features, interest rates, penalties, and how to manage their new credit account. Without learning this information quickly, customers may find themselves in financial trouble from misuse of their credit account.

Moreover, many customers rarely take advantage of the full range of benefits that accompany their credit cards. Some card issuing financial service providers offer one or more companion applications to complement the credit card and enhance the customer's experience. However, after receiving and activating their credit cards, many customers never download the application or link their credit card to enjoy the added benefits.

In view of the shortcomings of current systems, a convenient, interactive and informative card activation system is desired.

SUMMARY

Disclosed embodiments provide methods and systems for activating a card and providing information about the card using augmented reality.

Consistent with a disclosed embodiment, an augmented-reality account transaction card activation method is provided. The method may include capturing, by a video camera, a real-time image of an inactive account card, processing, by a processor in communication with the video camera, the captured real-time image to obtain card information presented on the account card; verifying an identity of an individual associated with the account card, displaying, on a display in communication with the processor, card activation queries overlaid on the real-time image, receiving, by an I/O device in communication with the processor, card activation data comprising responses to the displayed activation queries, identifying, by the processor, one or more card terms based on the obtained card information, displaying, on the display in communication with the processor, the one or more card terms overlaid on the real-time image, and indicating that the account card is activated based on the verification and received activation data.

Consistent with another disclosed embodiment, a real-time augmented reality account card activation system is provided. The system may include a memory device having instructions stored thereon, and one or more processors in communication with the memory device. The one or more processors may be configured to execute the stored instructions to capture a real-time image of an inactive account card, process the captured real-time image to obtain card information presented on the card, verify an identity of an individual associated with the account card, display card activation queries overlaid on the real-time image, receive card activation data comprising responses to the displayed activation queries, identify one or more card terms based on the obtained card information, display the one or more card terms overlaid on the real-time image, and indicate that the account card is activated based on the verification and received activation data.

Consistent with other disclosed embodiments, non-transitory computer-readable storage media may store program instructions, which are executed by at least one processor device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

Figure 1:
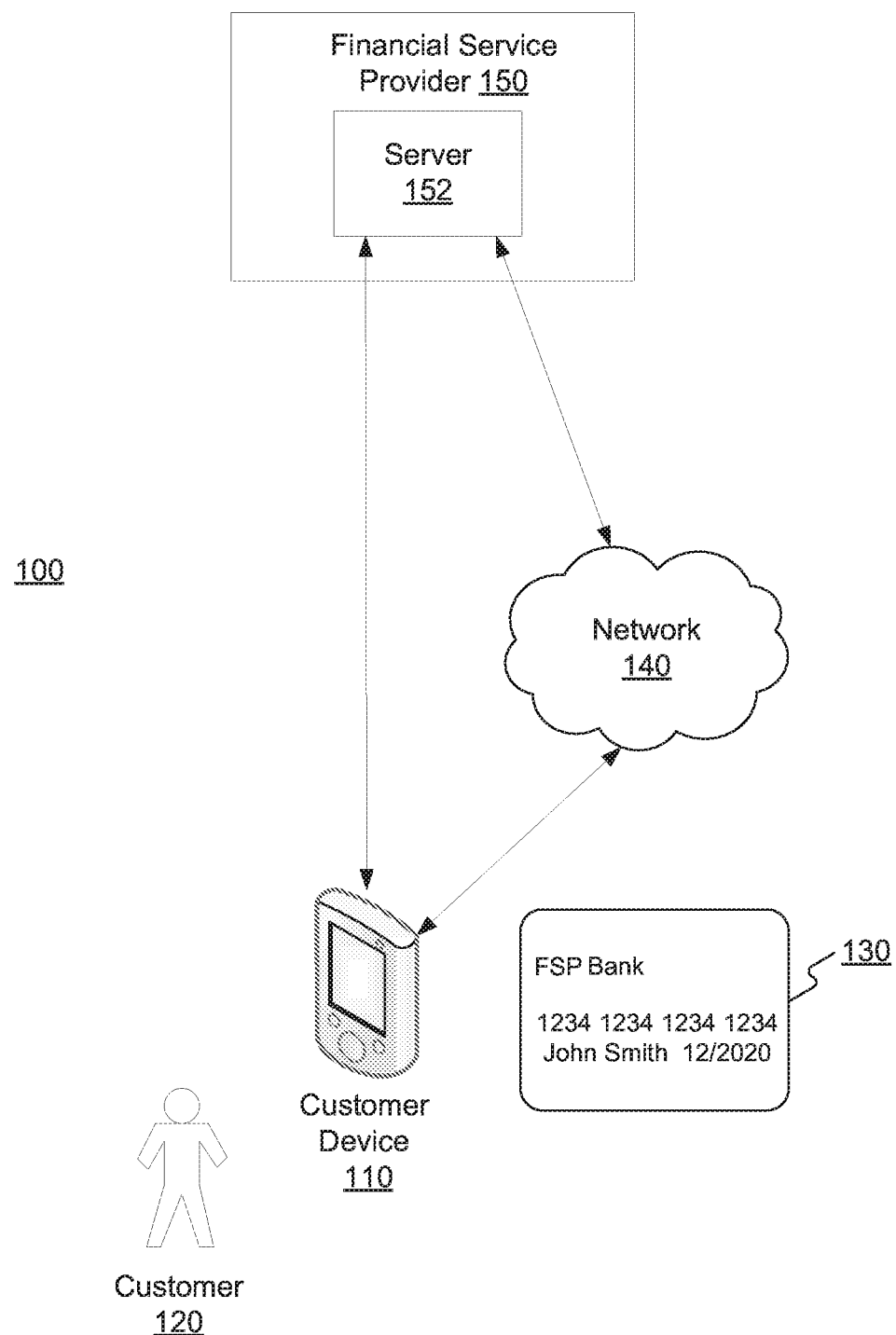
FIG. 1 is a diagram of an exemplary system that may be used to activate a card and provide card information, consistent with disclosed embodiments.

The disclosed embodiments are directed to systems and methods for activating new financial services cards, as well as learning about the cards and the credit card system, using augmented reality. In some embodiments, "augmented reality" means a live view of real-world elements, modified using computer processing such as computer generated graphics. The live view may include an image captured by a camera that is displayed in real-time on a display. The real-time image may be augmented by simultaneously overlaying computer-generated graphics including text, images, or video on the real-time image. The overlaid graphics may be generated in real-time based in part on the processed real-time image.

According to some embodiments, a customer may activate a new account card using their customer device running a computer-executable software application ("app") provided by an organization that issued the account card, such as a financial service provider ("FSP"). The account card may be a credit card, debit card, or other card or physical device used to conduct electronic account transactions associated with functions or activities of the FSP. In some embodiments, the "card" may be a check or near field communication (NFC) payment device. For purposes of explanation, this discussion will focus on credit cards. The FSP may be a bank, credit card company, or other entity associated with financial transactions. The mobile application may be a standalone software application for a personal computing device, such as personal computer software or a mobile device app, or part of another software application provided by the FSP for managing finances related to banking, checking, credit cards, and/or debit cards. It should be understood, however, that disclosed embodiments are not limited to any particular industry or field and, in fact, may be implemented by any entity associated with user registration, account activation, or the like. For example, in some embodiments, the account card may be a membership card or identification card issued by an organization such as a government agency, club, merchant, or any other organization that issues account cards specific to individual persons associated with the organization. Thus, the disclosed embodiments have uses other than in the financial services industry, as the type of transaction or nature of the organization that issues the card is merely tangential to the novelty of the disclosed embodiments. The disclosed embodiments provide advancements in the systems and methods for activating new account accounts using technological solutions involving specially-programmed devices and certain types of hardware, as disclosed herein.

In some embodiments, to activate a new card, the customer may launch an FSP app and capture an image of the new card using the camera on their customer device. The FSP app may then recognize the card, verify the card information with the financial service provider, and provide an immersive, interactive augmented reality set-up and/or education experience to explain the card and/or account features and allow the customer to adjust settings related to the card or the financial services associated with the card.

By implementing augmented reality, the systems and methods disclosed herein provide, among other things, an engaging product set-up experience that can help customers use their financial services wisely and efficiently from the start. As a further advantage, the augmented reality card activation systems and methods disclosed herein may facilitate the often cumbersome process of linking the card to the FSP app, which may provide features and incentives for the financial service associated with the card, enhancing the customer's experience.

Reference will now be made in detail to exemplary embodiments, examples of which are illustrated in the accompanying drawings and disclosed herein. Wherever convenient, the same reference numbers will be used throughout the drawings to refer to the same or like parts.

FIG. 1 shows a diagram of an exemplary augmented reality card activation system 100 that may be configured to perform one or more software processes that, when executed by one or more processors, activate new cards and provide an augmented reality tutorial and preferences setup experience, consistent with disclosed embodiments. The components and arrangements shown in FIG. 1 are not intended to limit the disclosed embodiments, as the components used to implement the disclosed processes and features may vary.

In accordance with disclosed embodiments, augmented reality card activation system 100 may include a customer device 110 associated with a customer 120, an account card 130, a financial service provider ("FSP") 150, and a FSP server 152. Customer device 110 may communicate with FSP server 152 directly or via network 140. Other components known to one of ordinary skill in the art may be included in system 100 to gather, process, transmit, receive, and provide information used in conjunction with the disclosed embodiments.

Customer 120 may be a customer of the financial service provider 150, such as an individual who holds a credit card, debit card, checking, and/or savings account with FSP 150. Customer 120 may operate customer device 110 to activate account card 130 and/or learn about account card 130, financial account terms associated with the card, etc. using the augmented card activation processes disclosed herein.

Customer device 110 may be a personal computing device such as, for example, a mobile device with computing ability, a tablet, smartphone, wearable device such as Google Glass™ or smart watches, a general purpose or notebook computer, or any combination of these computers and/or affiliated components. In one embodiment, customer device 110 may be a computer system or mobile computer device that is operated by customer 120 who is a customer of FSP 150.

FSP server 152 may be operated by FSP 150. FSP 150 may be an entity that provides financial services to customers, such as a bank, credit card company, merchant, lender, and the like. FSP server 152 may be a computer-based system including computer system components, desktop computers, workstations, tablets, hand held computing devices, memory devices, and/or internal network(s) connecting the components.

Network 140 may comprise any type of computer networking arrangement used to exchange data. For example, network 140 may be the Internet, a private data network, virtual private network using a public network, and/or other suitable connection(s) that enables system 100 to send and receive information between the components of system 100. Network 140 may also include a public switched telephone network ("PSTN") and/or a wireless network such as a cellular network, WiFi network, or other known wireless network capable of bidirectional data transmission.

Figure 2:
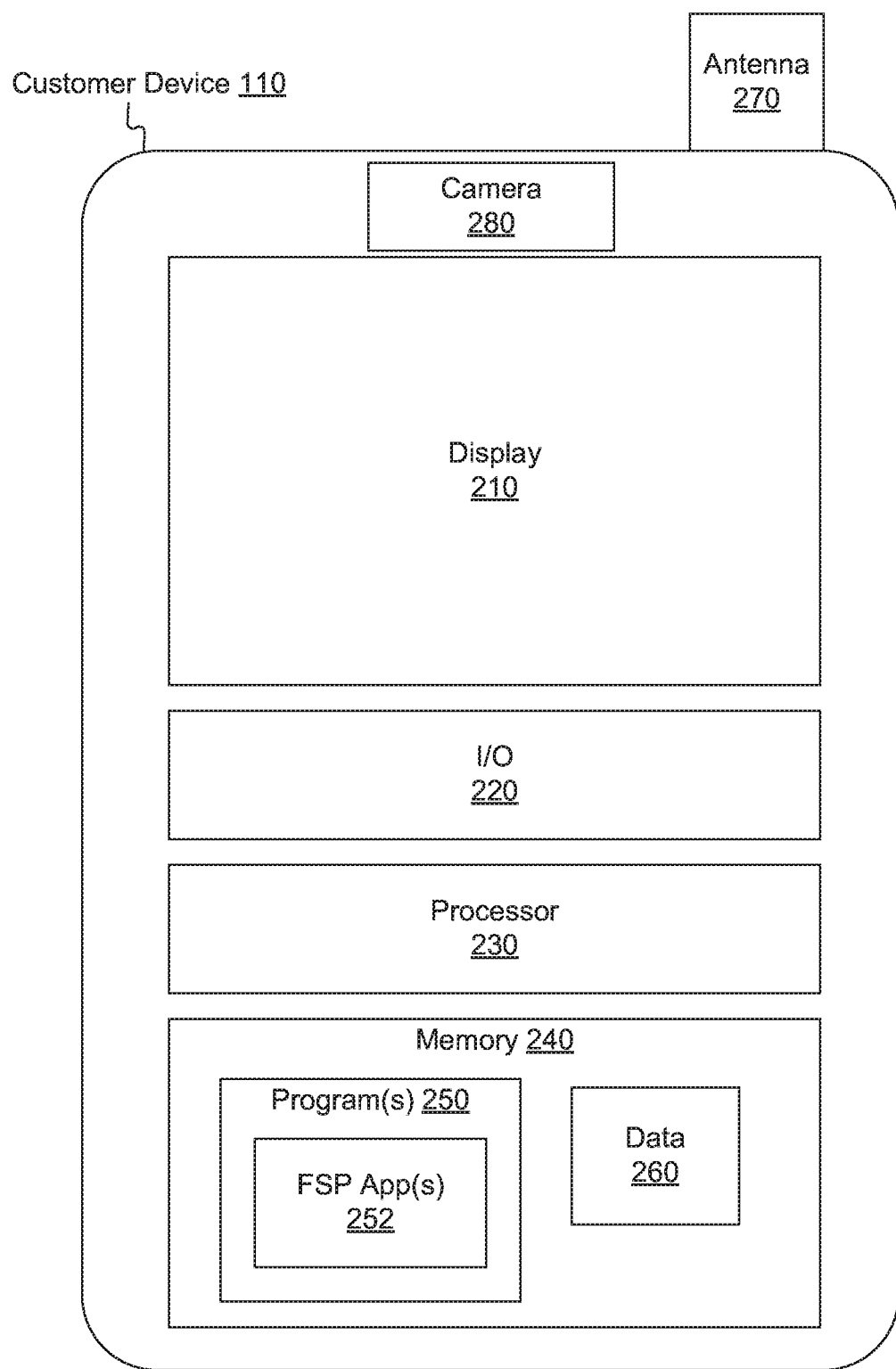
FIG. 2 is a diagram of an exemplary customer device, consistent with disclosed embodiments.

FIG. 2 shows a diagram of an exemplary customer device 110, consistent with disclosed embodiments. As shown, customer device 110 may include a display 210, input/output ("I/O") devices 220, one or more processors 230, memory 240 having stored thereon one or more programs 250, such as FSP app 252, and also storing data 260, and may further include an antenna 270 and one or more camera 280.

I/O devices 220 may include one or more devices that customer device 110 to receive input from customer 120 and provide feedback to customer 120. I/O devices 220 may include, for example, one or more buttons, switches, speakers, microphones, or touchscreen panels. In some embodiments, I/O devices 220 may be manipulated by customer 120 to input information into customer device 110.

Processor 230 may be one or more known processing devices, such as a microprocessor from the Pentium™ family manufactured by Intel™ or the Turion™ family manufactured by AMD™. Processor 230 may constitute a single core or multiple core processors that executes parallel processes simultaneously. For example, processor 230 may be a single core processor configured with virtual processing technologies. In certain embodiments, processor 230 may use logical processors to simultaneously execute and control multiple processes. Processor 230 may implement virtual machine technologies, or other known technologies to provide the ability to execute, control, run, manipulate, store, etc. multiple software processes, applications, programs, etc. In another embodiment, processor 230 may include a multiple-core processor arrangement (e.g., dual, quad core, etc.) configured to provide parallel processing functionalities to allow customer device 110 to execute multiple processes simultaneously. One of ordinary skill in the art would understand that other types of processor arrangements could be implemented that provide for the capabilities disclosed herein.

Memory 240 may be a volatile or non-volatile, magnetic, semiconductor, tape, optical, removable, non-removable, or other type of storage device or tangible (i.e., non-transitory) computer-readable medium that stores one or more program(s) 250 such as FSP app 252, and data 260. Data 260 may include, for example, customer 120's personal information, account information, and display settings and preferences.

Program(s) 250 may include operating systems (not shown) that perform known operating system functions when executed by one or more processors. By way of example, the operating systems may include Microsoft Windows™, Unix™, Linux™, Apple™ operating systems, Personal Digital Assistant (PDA) type operating systems, such as Microsoft CE™, or other types of operating systems. Accordingly, disclosed embodiments may operate and function with computer systems running any type of operating system. Customer device 110 may also include communication software that, when executed by a processor, provides communications with network 140, such as Web browser software, tablet, or smart hand held device networking software, etc. Customer device 110 may be a device that executes mobile applications for performing operations consistent with disclosed embodiments, such as a tablet or mobile device.

Program(s) 250 may also include FSP app(s) 252, such as an augmented reality card activation app, which when executed causes customer device 110 to perform processes related to card activation such as: activating and setting up a new account card 130, controlling camera 280 to capture real-time image data of account card 130, controlling processor to process the real-time image, establish bidirectional communication with FSP server 152, send card information and customer 110 credentials to FSP server 152, receive authentication and activation information from FSP server 152, generate augmented reality graphics, and display augmented reality graphics simultaneously with a real-time image of account card 130. In some embodiments, FSP app(s) 252 may include a mobile banking app associated with providing, managing, and/or maintaining financial service accounts including, for example, checking balances, paying bills, performing financial transactions, receiving marketing messages, etc.

Figure 3:
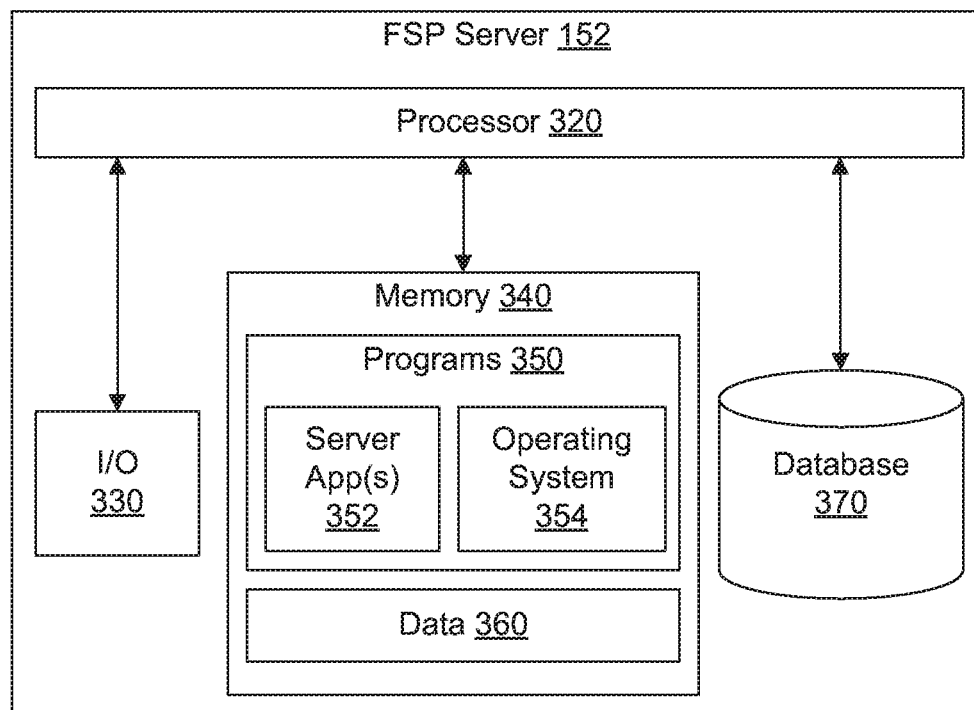
FIG. 3 is a diagram of an exemplary financial service provider server, consistent with disclosed embodiments.

FIG. 3 shows a diagram of an exemplary FSP server 152, consistent with disclosed embodiments. As shown, FSP server 152 may include one or more processor 320, input/output ("I/O") devices 330, memory 340 storing programs 350 including, for example, server app(s) 352, operating system 354, and storing data 360, and a database 370. FSP server 152 may be a single server or may be configured as a distributed computer system including multiple servers or computers that interoperate to perform one or more of the processes and functionalities associated with the disclosed embodiments.

Processor 320 may be one or more known processing devices, such as those described with respect to processor 230 in FIG. 2.

FSP server 152 may also include one or more I/O devices 330 that may comprise one or more interfaces for receiving signals or input from devices and providing signals or output to one or more devices that allow data to be received and/or transmitted by FSP server 152. For example, FSP server 152 may include interface components, which may provide interfaces to one or more input devices, such as one or more keyboards, mouse devices, and the like, that enable FSP server 152 to receive input from an employee of the financial service provider (not shown).

FSP server 152 may include one or more storage devices configured to store information used by processor 320 (or other components) to perform certain functions related to the disclosed embodiments. In one example, FSP server 152 may include memory 340 that includes instructions to enable processor 320 to execute one or more applications, such as server applications, a customer and card authentication application, a card activation authentication, an electronic transaction application, network communication processes, and any other type of application or software known to be available on computer systems. Alternatively or additionally, the instructions, application programs, etc. may be stored in an internal database 370 or external storage in direct communication with FSP server 152 (not shown), such as one or more database or memory accessible over network 140. Database 370 or other external storage may be a volatile or non-volatile, magnetic, semiconductor, tape, optical, removable, non-removable, or other type of storage device or tangible (i.e., non-transitory) computer-readable medium.

In one embodiment, FSP server 152 may include memory 340 that includes instructions that, when executed by processor 320, perform one or more processes consistent with the functionalities disclosed herein. Methods, systems, and articles of manufacture consistent with disclosed embodiments are not limited to separate programs or computers configured to perform dedicated tasks. For example, FSP server 152 may include memory 340 that may include one or more programs 350 to perform one or more functions of the disclosed embodiments. Moreover, processor 320 may execute one or more programs located remotely from account information display system 100. For example, FSP server 152 may access one or more remote programs, that, when executed, perform functions related to disclosed embodiments.

Programs 350 stored in memory 340 and executed by processor(s) 320 may include one or more server app(s) 352 and operating system 354. Server app(s) 352 may incorporate one or more financial services account apps that cause processor(s) 320 to execute one or more processes related to financial services accounts associated with one or more customers including, but not limited to, storing customer and account information, storing card information, processing card activation requests, authenticating customers and cards, storing card term information, and transmitting card activation results and card term information.

Memory 340 and database 370 may include one or more memory devices that store data and instructions used to perform one or more features of the disclosed embodiments. Memory 340 and database 370 may also include any combination of one or more databases controlled by memory controller devices (e.g., server(s), etc.) or software, such as document management systems, Microsoft SQL databases, SharePoint databases, Oracle™ databases, Sybase™ databases, or other relational databases.

FSP server 152 may also be communicatively connected to one or more remote memory devices (e.g., remote databases (not shown)) through network 140 or a different network. The remote memory devices may be configured to store information and may be accessed and/or managed by FSP server 152. By way of example, the remote memory devices may be document management systems, Microsoft SQL database, SharePoint databases, Oracle™ databases, Sybase™ databases, or other relational databases. Systems and methods consistent with disclosed embodiments, however, are not limited to separate databases or even to the use of a database.

Figure 4:
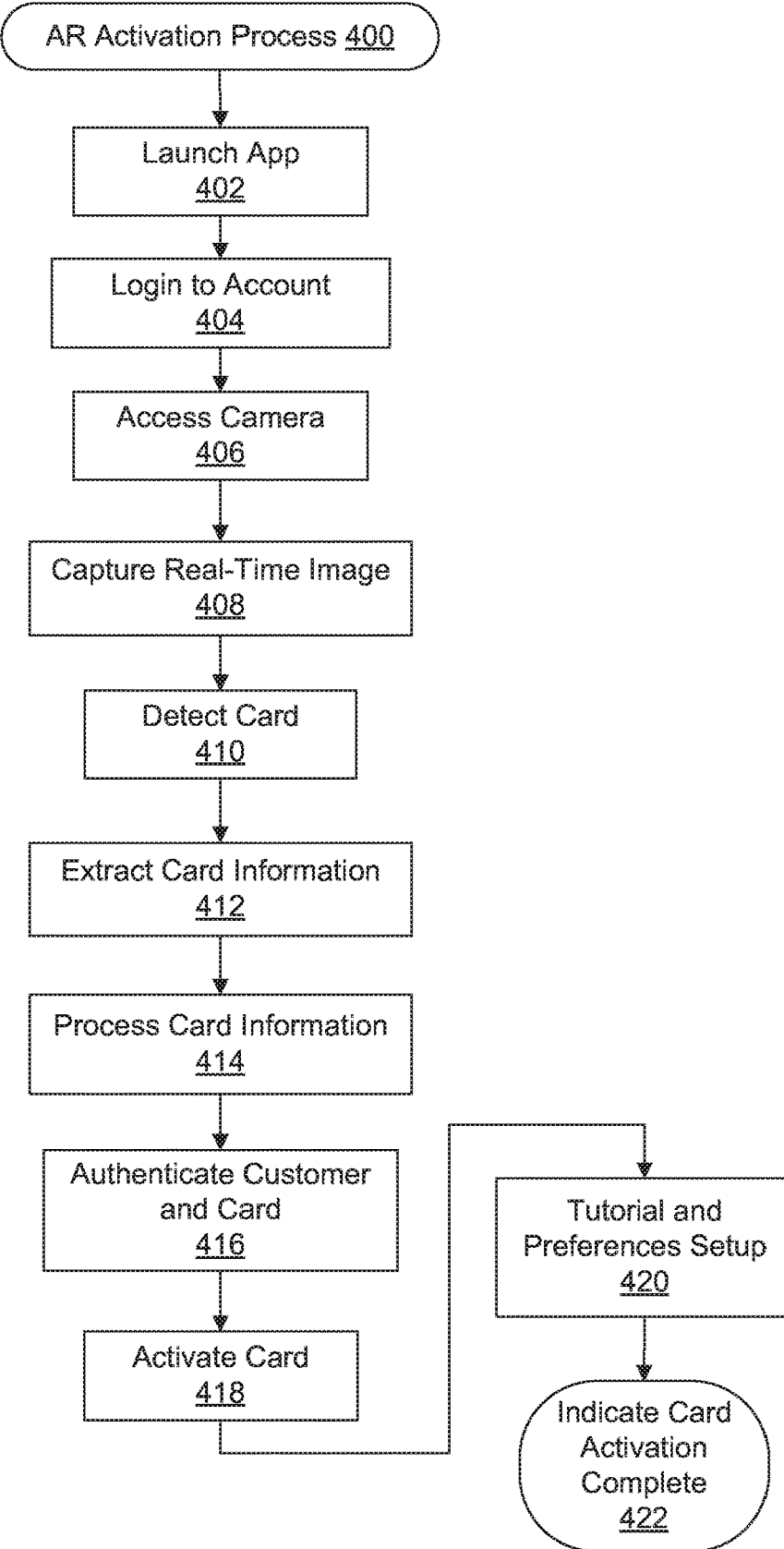
FIG. 4 is a flowchart of an exemplary augmented reality card activation process, consistent with disclosed embodiments.

FIG. 4 shows a flowchart of an augmented reality activation process 400. Augmented reality activation process 400 may begin in step 402, when customer device 110 launches FSP app 252 based on, for example, input received from customer 120. If FSP app 252 is not currently installed on customer device 110, such as when customer 120 is a new customer of FSP 150, customer device 110 may first download and install FSP app 252 (steps not shown). Customer device 110 may install FSP app 252 upon, for example, customer 120 operating the customer device 110 to navigate to a website, access an applications store/repository, or scanning a code (included, for example, with account card 130), such as a quick response (QR) code or a barcode, to automate the download and installation process.

After FSP app 252 launches, in step 404, customer device 110 may receive account login information associated with customer 120. Customer device 110 may prompt customer 120 to create a new account (for example, when FSP app 252 was just installed), to identify customer 120 to FSP 150. FSP app 252 may prompt customer 120 to enter one or more credentials to login to their account such as, for example, a name, username, password, birthdate, PIN number, etc.

In step 406, FSP app 252 may access one or more camera 280 in customer device 110. Customer device 110 may then prompt customer 120 to place an inactive account card 130 within view of camera 280 and capture an image (step not shown). Camera 280 may begin capturing a real-time image (step 408), and provide the real-time image, such as a continuous live video feed, to processor 220 for analysis based on the needs of FSP app 252.

In some embodiments, FSP app 252 may cause processor 220 to continuously analyze the real-time image data received from camera 280, to detect the inactive account card 130 in the image frame (step 410). In some embodiments, processor 220 may detect account card 130 by recognizing the shape and outline of the card within the real-time image. If processor 220 is unable to detect account card 130 after a predetermined time period, customer device 110 may prompt customer 120 to reposition account card 130 in front of camera 280 (step not shown).

In step 412, processor 220 may extract card information from the detected account card 130. In some embodiments, processor may employ one or more known character recognition algorithms to recognize characters such as letters, numbers, and symbols printed on the card.

In step 414, processor 220 may process the extracted card information. In some embodiments, processor 220 may parse the recognized characters into pieces of card information such as, for example, an account number, cardholder name, expiration date, security code, financial service provider name, card product (e.g. "Platinum," "Gold," etc.), and other pieces of card information based on FSP 150's needs. Processor 220 may cause the processed card information to be stored for later use by FSP app 252 and/or FSP server 152 (step not shown). In some embodiments, FSP server 152 may perform some or all of the card information processing. In such embodiments, customer device 110 may transmit unprocessed extracted card information to FSP server 152 via network 140.

In step 416, system 100 may authenticate customer 120 and account card 130. In some embodiments, authentication is performed at FSP server 152 by processor 320, based on the processed account card 130 information and the one or more customer 120 credentials transmitted from customer device 110 (step not shown). FSP server 152 may compare the processed account card 130 information and customer 120 credentials to one or more entries stored in database 370, to determine whether account card 130 is authentic and/or whether customer 120's identity is verified. Step 416 may incorporate one or more authentication processes for customer 120 and account card 130 known to those of ordinary skill in the art. In some embodiments, customer device 110 (via, e.g., processor 230) may perform some or all of the authentication steps based on the processed account card 130 information, customer 120 credentials, and based on data received from FSP server 152.

In step 418, FSP server 152 may activate account card 130. In some embodiments, activation may comprise updating database 370 to indicate that account card 130 is authorized to perform transactions for customer 120's account. FSP server 152 may transmit an indication to customer device 110 confirming that account card 130 is activated and ready to use for conducting financial transactions. In some embodiments, customer device 110 may display the activation confirmation to customer 120 immediately (step not shown). In other embodiments, customer device 110 may receive and store the activation confirmation until process 400 is complete.

Figure 5:
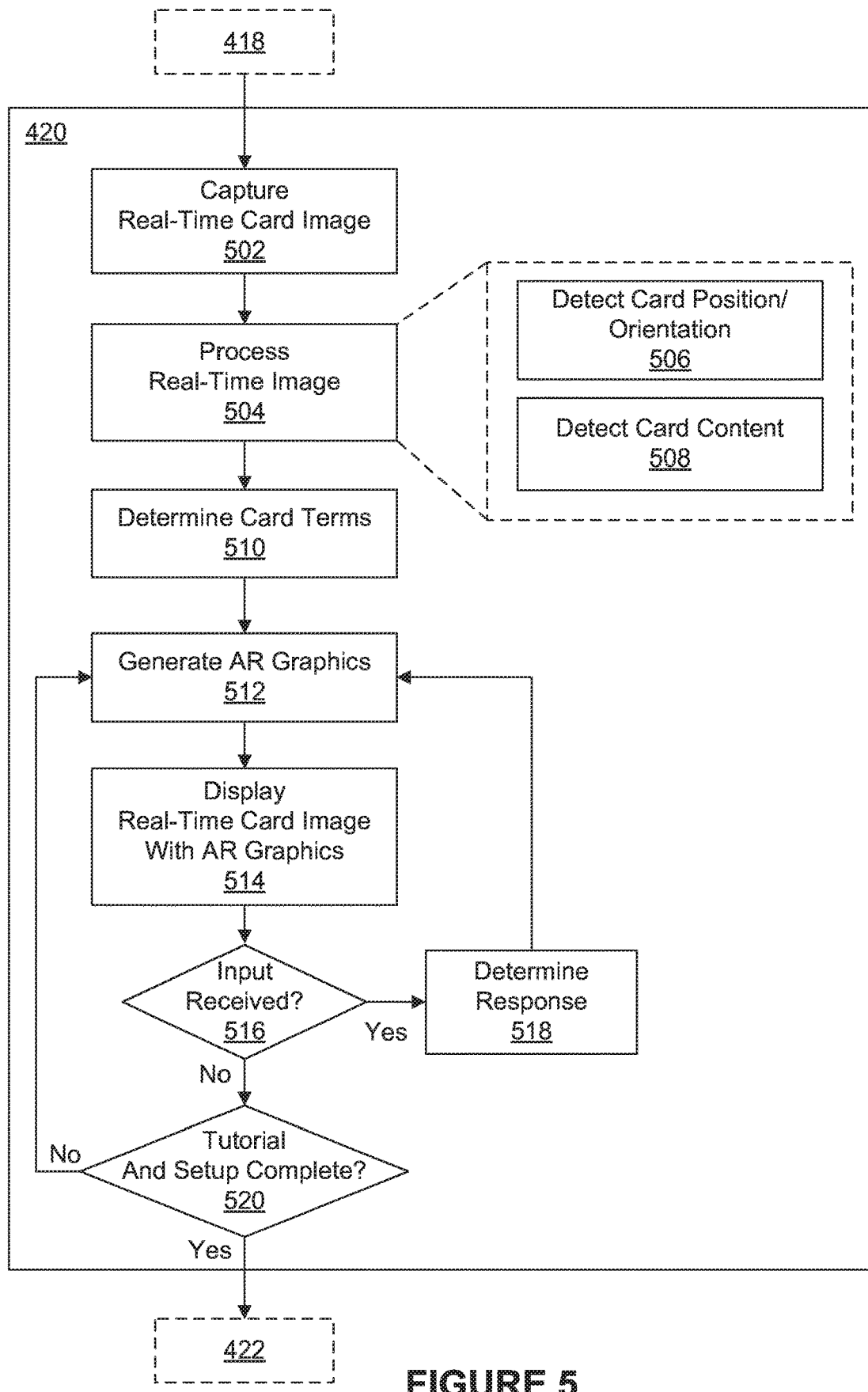
FIG. 5 is a flowchart of an exemplary tutorial and preferences setup process, consistent with disclosed embodiments.

In step 420, customer device 110 may launch a tutorial and preferences setup process, described in further detail with respect to FIG. 5. During tutorial and preferences setup process 420, customer device 110 may generate and display augmented reality graphics to educate customer 120 about the features of their card, card terms, and the financial service associated with the card. Customer device 110 may also generate augmented reality graphics related to one or more preferences, such as notification settings, spending goals, etc. Additionally, customer device 110 may generate and display augmented reality graphics related to associating account card 130 to FSP app 252 and/or customer device 110 to provide customer 120 with an enhanced features, such as account monitoring and managing through customer device 110.

Once tutorial and preferences setup process 420 completes, process 400 ends and customer device 110 may provide an indication to customer 120 that account card 130 is activated and ready for use in step 422. For example, customer device 110 (via, e.g., display 210) may display a message confirming activation of account card 130. In some embodiments, the account card 130 activation indication may be provided earlier in process 400, such as between steps 418 and 420.

FIG. 5 shows an exemplary flowchart of a tutorial and preferences setup, such as step process 420 from FIG. 4. In some embodiments, tutorial and preferences setup process 420 may occur after step 418 from FIG. 4. Process 420 may begin in step 502 when camera 280 captures a real-time image of account card 130, thereby capturing card image 132 (item illustrated in FIG. 6). In some embodiments, step 502 may be a continuation of step 408, where camera 280 continuously captures real-time image data throughout process 400. In other embodiments, step 502 may comprise a new image capture step when image capture step 408 previously ceased.

In step 504, processor 230 may process the real-time image including card image 132 to extract information necessary for tutorial and preferences setup process 420. In some embodiments, processor 230 may detect account card 130's position and orientation in the real-time image in step 506. For example, processor 230 may scan the real-time image to detect an object having the approximate shape and dimensions of a credit card, or another pre-programmed shape. Processor 230 may also detect the orientation of account card 130, such as by identifying text or patterns on account card 130 indicative of account card 130's orientation. In step 508, processor 230 may detect card content to be used in tutorial and preferences setup process 420.

Similar to step 412, processor 230 may extract card information such as a card number, cardholder name, security code, bank name, product name/type, and any other text, numbers, and symbols on account card 130. Regarding step 508, in some embodiments, processor 230 may also identify one or more positions of the pieces of card information in card image 132. The card information positions may be used to position augmented reality graphics on display 210 relative to the card information positions in card image 132. Processor 230 may continuously detect card content to update detected card information and card information positions if, for example, customer 120 moves account card 130 during process 420, such as by rotating account card 130 or flipping account card 130 to the reverse side.

In step 510, system 100 may identify one or more terms associated with the financial account of account card 130. In some embodiments, customer device 110 may transmit the extracted and detected card information to FSP server 152, and FSP server 152 may send one or more account terms back to customer device 110. FSP server 152 may query database 370 for account terms associated with one or more pieces of card information, such as an annual percentage rate (APR) associated with an extracted account card 130 number, cardholder name, card product/type, etc. Card terms may include, for example, a credit limit, billing cycle dates or length, APR, payment due date, annual fee, grace period, minimum payment amount, over-the-limit fee, variable interest rate, late fee amounts, and any other terms set by FSP 150 and associated with account card 130. FSP server 152 may then transmit the identify card terms to customer device 110 for use during the augmented reality tutorial and preferences setup. In some embodiments, customer device 110 may identify account card 130 terms without querying FSP server 152. For example, customer device 110 may have a database of card terms stored in memory 240, and processor 230 may compare the detected card content to stored card terms to identify terms for account card 130.

In step 512, processor 230 may generate augmented reality (AR) graphics for display over card image 132. Augmented reality graphics may include text, images, and/or video for explaining the determined account card 130 terms, or for educating customer 110 about the financial services associated with account card 130, such as how credit card systems work. Generated AR graphics may vary based on the determined card position and orientation, so that the AR graphics, when displayed, will appear to "interact" with card image 132 by resizing, relocating, rotating, or changing content based on the detected card position/orientation and the detected card content.

In some embodiments, FSP server may generate some or all AR graphics, and transmit the generated AR graphics to customer device 120 for display on display 210.

In step 514, display 210 may display the captured real time image including card image 132, and overlay the real-time image with the generated AR graphics. The AR graphics and real-time image may be displayed in real-time, e.g., as the image is being captured by camera 280. Depending on the processing speeds and capabilities of processor 230 and/or FSP server 152, step 514 may occur at a minor time lag behind step 502. Regardless, step 514 may be performed in substantially real-time, e.g. within seconds of real-time image capture step 502.

In step 516, processor 230 may determine whether any input from customer 120 has been received while displaying AR graphics. Customer device 110 may receive input via I/O devices 220, and/or through display 210 when customer device 110 includes a touchscreen. Input may include a selection of one or more icons displayed on display 210 and included in the AR graphics. In some embodiments, processor 230 may detect an input when customer 120 touches a part of card image 132 or AR graphic, or when customer 120 manipulates I/O devices 220 to select a part of card image 132 or AR graphic.

If processor 230 detects an input ("Yes" in step 516), in step 518, processor 230 may determine an appropriate response to the detected input. For example, when processor 230 detects a selection of a graphic or portion or card image 132 corresponding to a card code verification (CCV) number on account card 130, processor 230 may query FSP server 152 and/or data 260 for information related to the query such as, for example, a card term description, a tutorial video, a tutorial animation, or one or more images. Once processor 230 determines an appropriate response to the query, processor 230 may generate augmented reality graphics related to the query and the determined response (returning to step 512). For example, processor 230 cause display 210 to display further information regarding CCV numbers, such as when, how, and why they are used, etc. Repeating step 514, the newly-generated augmented reality graphics responding to the query may be displayed with card image 132 on display 210.

In some embodiments, the received input may be related to one or more preferences for account card 130 and/or the account associated with account card 130. For example, customer device 110 may display one or more augmented reality graphics prompting customer 120 to input one or more setting selections for account card 130, FSP app 252, or an FSP 150 account associated with account card 130. In some embodiments, settings may include, for example, spending alerts, payment due date alerts, remaining credit or balance alerts, spending limits, transaction amount limits, payment account options, or payment dates. Customer device 110 may transmit received settings input to FSP server 152 and/or update FSP app 252 with the received settings input.

In some embodiments, received input may be related to associating account card 130 to FSP app 252 and/or customer device 110. For example, processor 230 may receive an input from customer 120 requesting that account card 130 be associated with FSP app 252 and/or customer device 110, allowing FSP app 252 to, for example, require fewer security protocols become followed before displaying account information associated with account card 130 and performing functions related to managing account card 130 such as, for example, viewing statements, viewing rewards statuses, paying balances, reporting improper transactions to FSP 150, and other functions related to card management based on the needs of customer 120 and FSP 150. By incorporating one or more steps necessary to associate account card 130 with FSP app 252 during tutorial and preferences setup process 420, customer 120 can immediately enjoy the benefits provided by FSP app 252, without the need for performing additional configuration and setup steps at a later time. Thus, the disclosed embodiments provide a single convenient and interactive experience during which a new card can be activated, configured, and linked to a companion application such as FSP app 252. Furthermore, the disclosed embodiments encourage customers to download and install the companion application upon receiving the card, ensuring that more customers benefit from the enhanced experience provided by the companion application.

Returning to step 516, if processor 230 does not detect input for a predetermined amount of time ("No" in step 516), in step 520 processor 230 may determine whether tutorial and setup process 420 is complete. Process 420 may complete once all required augmented reality graphics have been displayed and all required inputs have been received. In some embodiments, FSP 252 and/or FSP server 152 may store a script of the required augmented reality graphics and required inputs required to complete tutorial and setup process 420. If processor 230 determines that tutorial and setup process 420 is complete ("Yes" in step 520), then process 400 (referring to FIG. 4) may proceed to step 422.

Returning to step 516, if processor 230 determines that tutorial and setup process 420 is not complete ("No" in step 520), then process 420 may return to step 512 in which processor 230 generates new, modified, and/or the same augmented reality graphics. Processor 230 may determine that tutorial and setup process 420 is not complete when, for example, required AR graphics have yet to be displayed, or additional inputs from customer 120 are required.

Figure 6A:
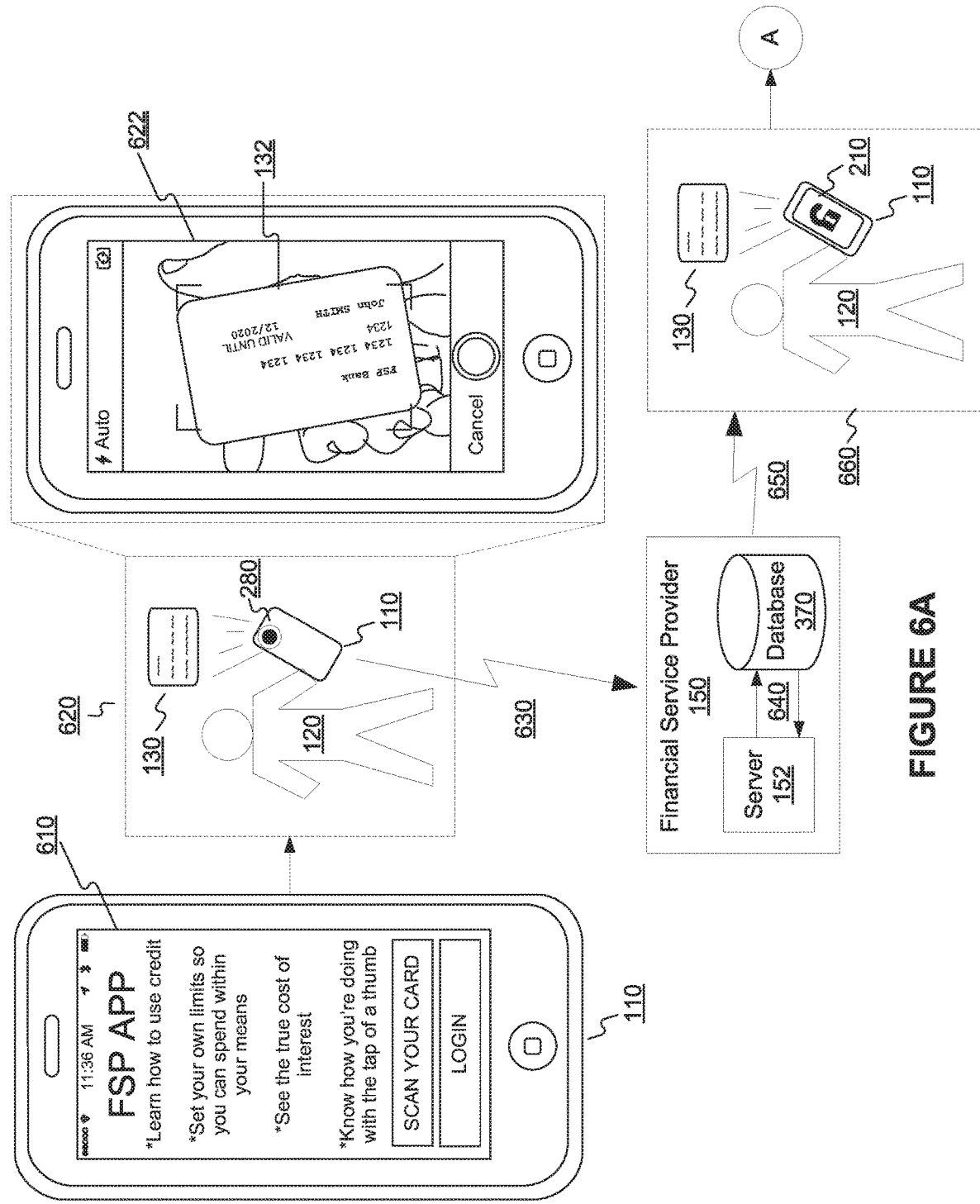
FIGS. 6A-6B are illustrations of portions of an exemplary augmented reality card activation process, consistent with disclosed embodiments.
Figure 6B:
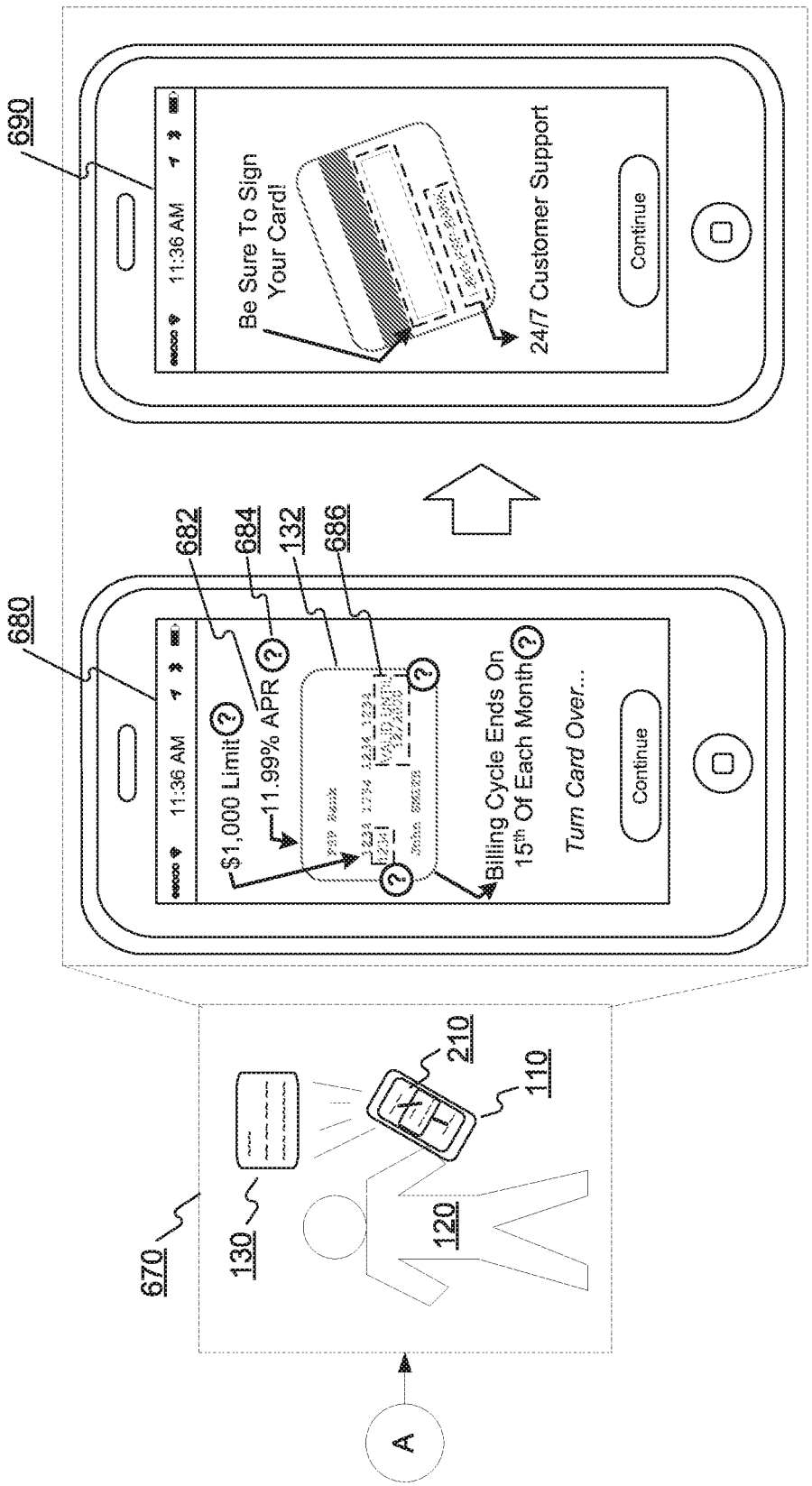

FIGS. 6A and 6B are illustrations of an exemplary augmented realty card activation process consistent with disclosed embodiments. Turning to FIG. 6A, customer device 110 may display welcome screen 610 in FSP app 252, which may provide a brief explanation of the augmented reality card activation process, and include one or more buttons for allowing customer 120 to login to their FSP 150 account, or scan their new account card 130 for activation. If customer 120 selects a button for scanning a new card in scenario 620, customer 120 may begin capturing a real time image of account card 130 using camera 280 of customer device 110. During the capture process, customer device 110 may display a card capture screen 622 showing a real-time card image 132 of account card 130. Customer device 110 may process card image 132 to extract one or more pieces of card information. Customer device 110 may transmit the extracted card information and one or more customer 120 credentials to one or more computers operated by FSP 150, such as FSP server 152, in step 630. FSP server 152 (via, e.g., processor 320) may query database 370 in step 640 to determine whether the received account card 130 information and/or customer 120 credentials match information for one or more FSP 150 accounts stored in database 370. Server 152 may also receive an indication of whether database 370 contains a match sufficient to activate account card 130 and authenticate customer 120. FSP server 152 may transmit an authentication and/or activation indication to customer device 110 in step 650. In scenario 660, customer device 110 may receive the indication from FSP server 152. In some embodiments, customer device 110 may provide an indication of authentication and activation immediately on display 210. In some embodiments, customer device 110 may store the account card 130 activation indication for later use, and only display the authentication indication at this stage in the process. As shown in scenario 660, the steps and processes discussed herein may occur while customer 120 is continuing to capture real-time images of account card 130 using customer device 110.

Proceeding now to A, and referring now to FIG. 6B, in scenario 670 customer device 110 may launch the tutorial and preferences setup, by displaying augmented reality graphics in conjunction with real-time card image 132 on display 210 of customer device 110. As shown, customer 120 may continue to capture real-time images of account card 130 using customer device 110. Customer device 110 may display augmented reality graphics in conjunction with card image 132 as illustrated in the example shown in a first interface 680 and a second interface 690.

In first interface 680, customer device 110 may display card image 132, that is an image of account card 130 displayed in real-time as camera 280 is capturing the image. Processor 230 may generate one or more augmented reality graphics based on analysis of card image 132. For example, augmented reality graphics may vary based on account card 130's position on display 210, account card 130's orientation, and card information extracted from card image 132. Augmented reality graphics may include information about card terms for account card 130, such as an Annual Percentage Rate graphic 682.

Augmented reality graphics may include one or more graphics that prompt or invite input from customer 120. For example, an icon such as question mark icon 684 may appear next to displayed card terms, or next to parts of card image 132, inviting customer 120 input to learn more about that card term or part of account card 130.

Augmented reality graphics may appear relative to the position of card image 132, and may include arrows, symbols, or other notation that appear to "interact" with parts of card image 132. For example, augmented reality graphics may include arrows extending from a card term graphic to a particular part of card image 132, or to an edge of card image 132. Furthermore, augmented reality graphics may include one or more dashed-line boxes, solid line boxes, underling, or other emphasizing notation, to highlight a particular portion of card image 132. As an example, box 686 may appear on card image 132, with a question mark icon or with a card term description, to either prompt customer 120 to request more information about the highlighted portion or proactively provide information about the highlighted card term. In the illustrated example, box 686 surrounds account card 130's expiration date, and a question mark icon appears next to box 686 to allow customer 120 to learn more about account card 130's expiration date.

As discussed above, augmented reality graphics may change continuously in response to a continuous analysis of real-time images captured by camera 280. Second interface 690 illustrates an example of how augmented reality graphics may change. In the example, account card 130 is flipped to its reverse side, presumably by customer 120 holding account card 130. Upon detecting the new real-time image data, processor 230 may change the augmented reality graphics to correspond to account card 130's position, orientation, and content. In second interface 690, augmented reality graphics no longer include card terms and graphics related to card information from account card 130's front face. Instead, augmented reality graphics are displayed corresponding to the reverse side of account card 130. In the illustrated example, augmented reality graphics remind customer 120 to sign account card 130 by outlining the signature box, and displaying a message with an arrow pointing to the signature box. Augmented reality graphics may also outline FSP 150 contact information such as a phone number printed on account card 130, and inform customer 120 of when they may contact FSP 150.

Notably, account card 130 is in a rotated position in second interface 690, and is not perpendicular to display 210. As discussed earlier, augmented reality graphics may vary depending on account card 130's position and orientation. In the illustrated example, emphasis graphics such as dashed boxes, and arrows pointing to card image 132 are angled and positioned in a manner that corresponds to the position and orientation of account card 130 in card image 132.

FIGS. 6A and 6B are not meant to limit embodiments of the present disclosure in any way, and those of ordinary skill in the art will realize that customer device 110 may generate and display different augmented reality graphics depending on the needs of FSP 150 and customer 120.

Those skilled in the relevant arts would recognize that the augmented reality activation methods and systems described herein could be used for purposes other than activating a credit card. For example, the augmented reality methods could be used to guide customers through the parts and terms of their account statement or bill.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system, non-transitory computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A computer-implemented method, comprising:
   capturing, by a camera, an image of an object associated with an account;
   processing, by a processor in communication with the camera, the captured image to obtain first information associated with the account;
   generating, by the processor, an augmented reality (AR) graphic based on the image, the augmented reality graphic including:
      second information about the object that is not presented on the object, and
      a tutorial for facilitating an activation;
   displaying, on a display in communication with the processor, an AR graphic configured to obtain user input, the AR graphic comprising an object activation query overlaid on the image;
   detecting a change to a position or an orientation of the object;
   modifying, based on the detected change, the AR graphic;
   receiving a first user input comprising a response to the object activation query; and
   transmitting, to a server, an activation request comprising information relating to the received first user input.

2. The computer-implemented method of claim 1, wherein the change to the position or the orientation of the object is in response to not being able to detect the object.

3. The computer-implemented method of claim 1, wherein the AR graphic associated with the tutorial includes one or more of: features associated with the object, preferences associated with the object, and informative data associated with the object.

4. The computer-implemented method of claim 3, further determining whether the tutorial is complete by determining whether all required inputs have been received.

5. The computer-implemented method of claim 1, wherein the AR graphic includes at least one of a text field, the image, or a video explaining financial services associated with the object to a user of the object.

6. The computer-implemented method of claim 1, wherein modifying the AR graphic further comprises at least one of resizing the AR graphic, relocating the AR graphic, rotating the AR graphic, or changing content of the AR graphic.

7. The computer-implemented method of claim 1, wherein detecting the change to the position or the orientation of the object further comprises:
   detecting the object for a predetermined time period and when no object is detected, prompting a user to reposition the object; and
   when the object is detected, extracting object information from the detected object.

8. A system, comprising:
   one or more processors; and
   one or more memory devices storing instructions that, when executed by the one or more processors, performs operations including:
      capturing, by a camera, an image of an object associated with an account;
      processing, by a processor in communication with the camera, the captured image to obtain first information associated with the account;

generating, by the processor, an augmented reality (AR) graphic based on the image, the augmented reality graphic including:
  second information about the object that is not presented on the object, and a tutorial for facilitating an activation;
displaying, on a display in communication with the processor, an AR graphic configured to obtain user input, the AR graphic comprising an object activation query overlaid on the image;
detecting a change to a position or an orientation of the object;
modifying, based on the detected change, the AR graphic;
receiving a first user input comprising a response to the object activation query; and
transmitting, to a server, an activation request comprising information relating to the received first user input.

9. The system of claim 8, wherein the change to the position or the orientation of the object is in response to not being able to detect the object.

10. The system of claim 8, wherein the AR graphic associated with the tutorial includes one or more of: features associated with the object, preferences associated with the object, and informative data associated with the object.

11. The system of claim 10, further determining whether the tutorial is complete by determining whether all required inputs have been received.

12. The system of claim 8, wherein the AR graphic includes at least one of a text field, the image, or a video explaining financial services associated with the object to a user of the object.

13. The system of claim 8, wherein modifying the AR graphic further comprises at least one of resizing the AR graphic, relocating the AR graphic, rotating the AR graphic, or changing content of the AR graphic.

14. The system of claim 8, wherein detecting the change to the position or the orientation of the object further comprises:
  detecting the object for a predetermined time period and when no object is detected, prompting a user to reposition the object; and
  when the object is detected, extracting object information from the detected object.

15. A non-transitory computer readable medium, storing software instructions that, when executed by one or more processors, cause the one or more processors to perform operations comprising:
  capturing, by a camera, an image of an object associated with an account;
  processing, by a processor in communication with the camera, the captured image to obtain first information associated with the account;
  generating, by the processor, an augmented reality (AR) graphic based on the image, the augmented reality graphic including:
    second information about the object that is not presented on the object, and a tutorial for facilitating an activation;
  displaying, on a display in communication with the processor, an AR graphic configured to obtain user input, the AR graphic comprising an object activation query overlaid on the image;
  detecting a change to a position or an orientation of the object;
  modifying, based on the detected change, the AR graphic;
  receiving a first user input comprising a response to the object activation query; and
  transmitting, to a server, an activation request comprising information relating to the received first user input.

16. The non-transitory computer readable medium of claim 15, wherein the change to the position or the orientation of the object is in response to not being able to detect the object.

17. The non-transitory computer readable medium of claim 15, wherein the AR graphic associated with the tutorial includes one or more of: features associated with the object, preferences associated with the object, and informative data associated with the object.

18. The non-transitory computer readable medium of claim 17, further determining whether the tutorial is complete by determining whether all required inputs have been received.

19. The non-transitory computer readable medium of claim 15, wherein the AR graphic includes at least one of a text field, the image, or a video explaining financial services associated with the object to a user of the object.

20. The non-transitory computer readable medium of claim 15, wherein modifying the AR graphic further comprises at least one of resizing the AR graphic, relocating the AR graphic, rotating the AR graphic, or changing content of the AR graphic.

* * * * *